United States Patent [19]

Rabasse

[11] 3,941,990

[45] Mar. 2, 1976

[54] SERIES TYPE ADDER FOR ADDING PLURAL BINARY NUMBERS

[75] Inventor: Jean Rabasse, Breuillet, France

[73] Assignee: Compagnie Industrielle des Telecommunications Cit-Alcatel, France

[22] Filed: Jan. 2, 1974

[21] Appl. No.: 429,803

[30] Foreign Application Priority Data

Dec. 29, 1972 France .............................. 72.47029

[52] U.S. Cl. .............................................. 235/176
[51] Int. Cl.² ......................................... G06F 7/385
[58] Field of Search ..................................... 235/176

[56] References Cited
UNITED STATES PATENTS 3,264,458   8/1966   Cromleigh ........................ 235/176

Primary Examiner—Joseph F. Ruggiero
Assistant Examiner—Errol A. Krass
Attorney, Agent, or Firm—Craig & Antonelli

[57] ABSTRACT

Series type adder receiving numbers having different polarities, constituted by elementary series type adders combining the positive input numbers and the true complements of the negative input numbers to work out the sum Σ thereof, characterized in that it comprises means for calculating the sum S of the sign bits of the negative input numbers and effecting the storing thereof in a memory, means for extracting the exceeding number D appearing at the end of the calculating of Σ, means for comparing S and D in order to determine the sign of Σ existing in a memory register and in order to control the transferring thereof in true form, in an output, preceded by its sign.

10 Claims, 2 Drawing Figures

SERIES TYPE ADDER FOR ADDING PLURAL BINARY NUMBERS

The present invention comes within the branch of series type binary adders effecting the sum of binary elements applied to its inputs.

It is a known practice to constitute an elementary series type binary adder, effecting the adding of two numbers emitted simultaneously in the form of two pulse trains having increasing weights, by a logic circuit having two inputs receiving respectively the two pulse trains and a third input on which the outgoing carry-over is re-injected after having been delayed by a pulse period. An elementary series type adder thus has two outputs: a "carry-over" output for a carry-over to be re-injected at the carry-over input and a "sum" output on which is sent out the result of the addition effected.

It is thus possible to produce a series type adder effecting the adding of more than two numbers starting with several elementary series type adders having three inputs and two outputs each. These elementary series type adders combine in threes, at their inputs, the bits taken from among the bits having the same weight of the input binary numbers to be added, the carry-over bits suitably delayed by one order in relation to the bits which gave rise to them sent out at the carry-over outputs, the part sum bits sent out on the sum outputs of the respective adders except for one of them which will send out the successive bits of the complete addition.

FIG. 1 shows an example of such a series type adder effecting the adding of four input binary numbers N1, N2, N3 and N4. That adder comprises three elementary series type adders 1, 2 and 3 having three inputs each, respectively 11 to 13, 21 to 23 and 31 to 33.

They each have a sum output for the sum effected 14, 24 or 34 and a carry-over output for the sum effected 15, 25 or 35, the carry-over bit being re-injected suitably delayed on one of the preceding inputs. In that example, the output 14 of the elementary series type adder 1 is used for sending out the result of the addition effected.

The inputs 11, 12, 21, 22 of the elementary adders 1 and 2 receive successively the bits having the same weight or orders of the numbers to be added. The sum output of the elementary adder 2 is directly connected to the input 13 of the elementary adder 1. The inputs 31 and 32 of the elementary adder 3 receive the carry-over bits sent out at the carry-over outputs 15 and 25 of the elementary adders 1 and 2. The carry-over output 35 of the adder 3 is connected through a flip-flop 36 ensuring the carrying over of that bit to the input 33 of that adder; the carry-over bit at 35 is thus delayed by one order before being re-injected at the input 33. The sum output 34 of the elementary adder 3 is connected up through a carry-over flip-flop 37 to the input 23 of the elementary adder 2; the bit, coming from the sum of the carry-over effected by the elementary adder 3 is thus delayed by one order and re-injected at the input 23 of the elementary adder 2.

Such a series adder effects therefore the sum of four binary numbers by a suitably shifted carrying over of the balances sums which the elementary adders constituting it send out.

It is also known that the subtracting operation is the equivalent of the adding of the true complement of the number to be subtracted, that true complement resulting from the addition of a unit having a smaller weight than the restricted complement of that number, the restricted complement itself being defined, is a system having a base of $n$, by the difference between $n-1$ and that number. Thus, in the binary system, the restricted complement is obtained by taking the complement of the successive bits; the true complement is then formed by adding a unit having a smaller weight than that restricted complement. In the result of a subtraction thus effected (adding of the true complement of the number to be subtracted) there appears an exceeding element of lower order to be cancelled out in the result but significant of the sign of the result.

With a view to distinguishing a positive number from a negative number, it is a known practice to assign a sign bit to these numbers which then arrive with the sign bit foremost followed by the binary elements which characterize them, in an order of increasing power. It is a convention to make the bit 0 correspond to the positive sign and the bit 1 correspond to the negative sign.

Thus, when there is an addition of several numbers having different polarities, it is possible to effect, by series adders of the same type as that in FIG. 1, the total of the positive numbers which are recognizable by their 0 sign bit and the total of the negative numbers which are recognizable by their 1 sign bit. An elementary series type adder then effects the adding of the total of the positive numbers and of the true complement of the total of the negative numbers. The exceeding element, to be cancelled out in the result of the subtraction effected is significant of the sign of the result at the output of that elementary series type adder.

An exceeding element whose value is 1 corresponds to a positive result applied in its true form and the absence of an exceeding element, corresponding to an exceeding element whose value is 0, means that the result is negative and is applied in the form of a true complement; in that latter case, it is therefore necessary, in order to have the negative result, in its true form, to take the true complement of the result given by the elementary series type adder (the sum of a number in its true form and of its true complement being nil and being accompanied itself by an exceeding number having the value 1 which is to be eliminated).

Nevertheless, the producing of such a series type adder intended for receiving several numbers having different polarities at these inputs requires a directing of the input numbers according to their sign, towards one or the other of the two series type adders intended for receiving respectively the positive numbers and the negative numbers and, in each of these latter, a maximum number of elementary series type adders corresponding to the case where all the input numbers have the same sign.

The aim of the present invention is to produce a series adder not having such disadvantages inasmuch as concerns the directing operations and the number of elementary series type adders which constitute it.

The present invention has for its object a series type adder intended for receiving binary numbers of any polarity, having, foremost, sign bits, working out, in successive clock periods, the result $\Sigma$ of the adding of the positive numbers and of the true complements of the negative numbers, then providing an exceeding data D subsequent to the result 93, comprising detection circuits for the said sign bits of the numbers, means for forming the true complements of the negative numbers, an assembly consisting of elementary series type adders connected with delay circuits for re-injecting, carry-over bits and bits for the sum of the carry-overs worked out, on the inputs of the said elementary series type adders and a memory for storing the said Σ, characterized in that it comprises, moreover:

A circuit for extracting the sum S from the sign bits of the negative numbers and an auxiliary memory for storing the said sum S;

A circuit for extracting the said exceeding data D;

A comparator for comparing the sum S and the said exceeding data D for sending out a binary sign element of the said result Σ existing in the said memory;

A transfer circuit for the result Σ controlled by the said comparator, to send out in the true form the sum of the said numbers preceded by the said binary element characteristic of its sign.

The series adder according to the invention takes advantage of the fact that the comparing of the said sum S and the said exceeding data D is significant of the sign of the result and of the form in which it is in the memory: If $D \leq S$, the result Σ is negative and is applied in the form of a true complement; if $D > S$, the result Σ is positive and is in the memory in the true form.

Other characteristics and advantages of the present invention will become apparent from the description of an embodiment given with reference to the accompanying drawing, in which.

Figure 1:
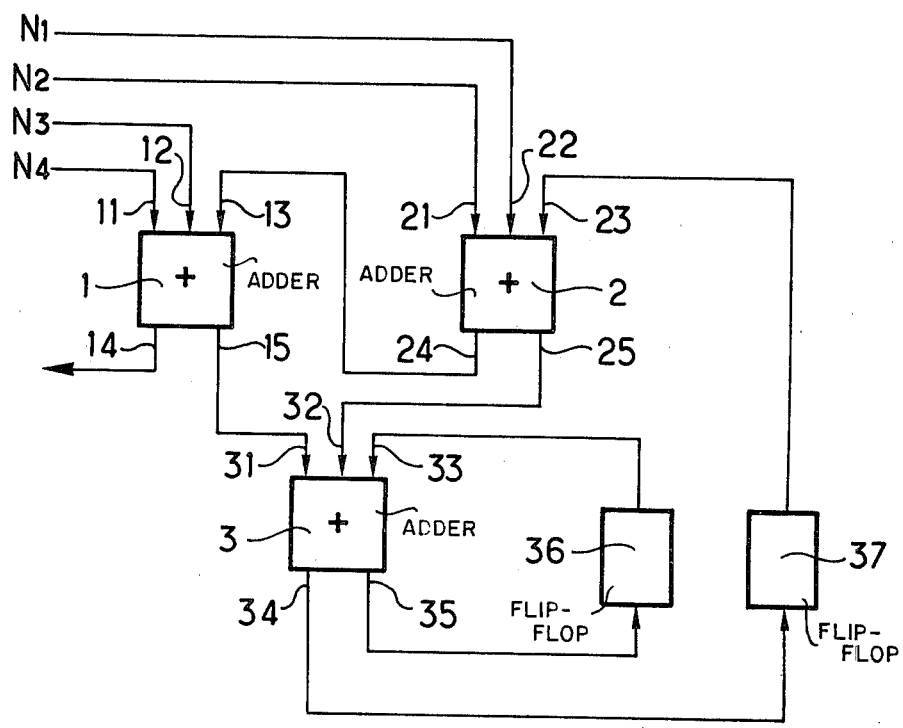
FIG. 1 shows a known diagram of a series type adder receiving four input figures; that series type adder has been described hereinbelow.
Figure 2:
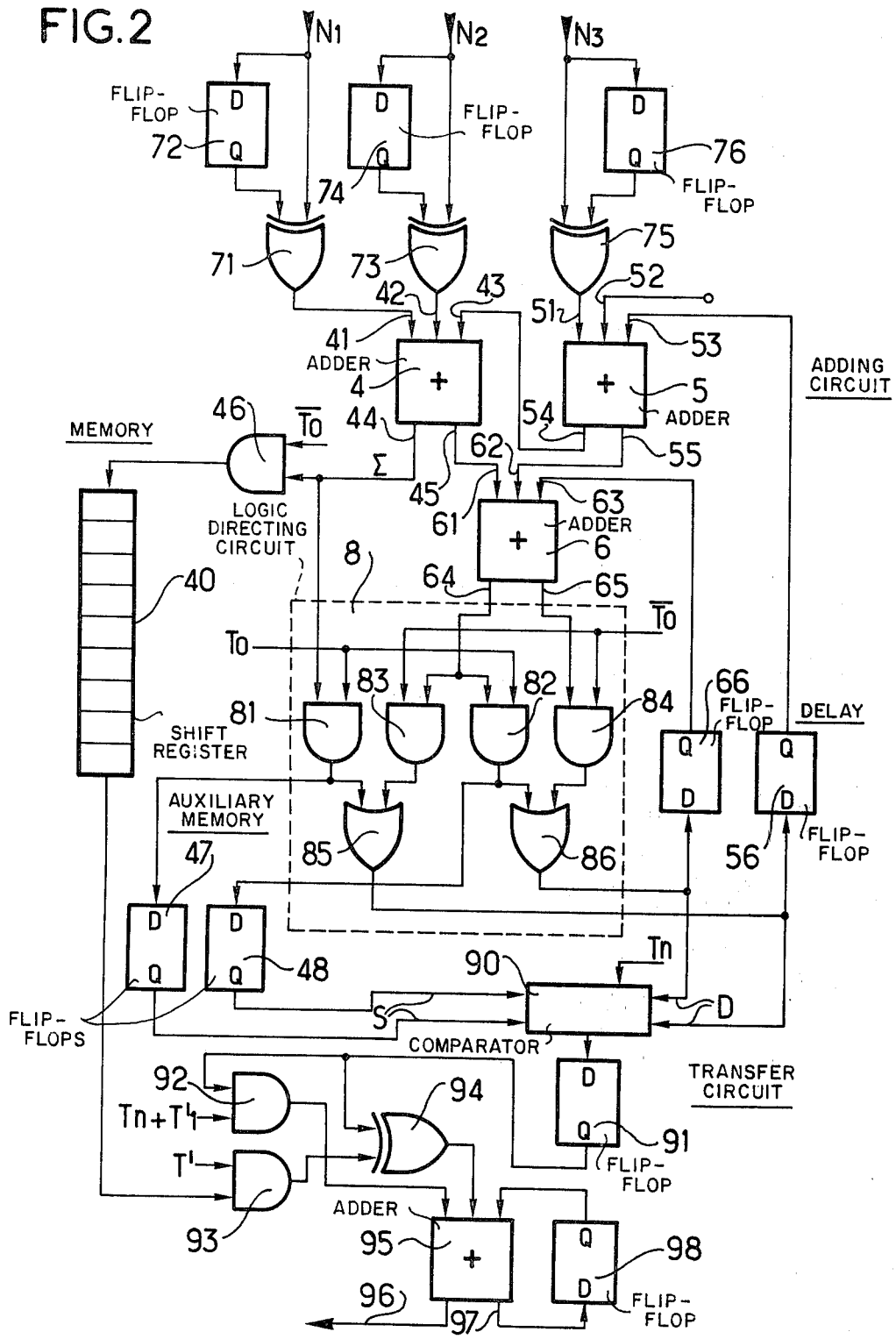
FIG. 2 shows the diagram of a series type adder according to the invention.

In FIG. 2, the case in which three numbers having any polarity are to be added has been taken into consideration.

Each of the numbers to be added designated by N1, N2 and N3 is in binary form; the first binary element is the sign bit; the following binary elements are the bits which characterize it; these latter bits are sent out in an order of increasing power. The binary numbers N1, N2 and N3 are applied simultaneously to the series type adder.

The series type adder comprises three elementary series type adders 4, 5 and 6, each having three inputs respectively 41 to 43, 51 to 53, 61 to 63, a sum output 44, 54, 64 and a carry-over output 45, 55, 65. The numbers N1, N2 and N3 are applied to a first input of three logic gates of the "exclusive OR" type, 71, 73, and 75, which transmit them respectively to the inputs 41, 42 and 51 of the elementary series type adders 4 and 5. On their respective second inputs, the three exclusive OR gates receive the outputs of three flip-flops 72, 74 and 76 respectively controlled, throughout the duration of the operation for the adding of N1, N2 and N3, by the sign bit assigned to the number applied to the corresponding exclusive OR gate.

The sum output 54 of the elementary series type adder 5 is connected up directly to the input 43 of the elementary series type adder 4. The carry-over outputs 45 and 55 of the adders 4 and 5 are applied to the inputs 61 and 62 of the adder 6.

The inputs 53 and 63 of the adders 5 and 6 are connected up to the outputs of two carry-over flip-flops 56 and 66. The input and the output of each of these flip-flops and of the flip-flops mentioned hereinafter are designated respectively by D and Q. These flip-flops 56 and 66 are controlled by a logic directing circuit 8 transmitting either the sum of the sign bits of the numbers N1, N2 and N3 sent out at 44 and 64, with a view to applying towards the inputs 56 and 66 respectively, as many 1's, sent out by one and/or the other of the flip-flops 66 and 56 as there are digits in restricted complements applied respectively at 41, 42 and 51, (that possible re-injection of one or two 1's shifted by one order taking into account the necessary transformation of the restricted complements and true complements), or the sum sent out at 64 and the carry-over sent out at 65 with a view to the suitably shifted carrying over of the balance figures of the addition effected. An embodiment of that logic circuit 8 shown in FIG. 2 is described hereinafter.

The sum output 44 of the elementary series adder 4 sends out the result Σ of the addition effected: it is connected to a memorizing register 40, for example of the shift register type, through a logic AND gate 46 one of whose inputs is connected up to the output 44.

The sum outputs 44 and 64 of the adders 4 and 6 send out also the sum S of the sign bits of the numbers N1, N2 and N3. That sum is directed through the logic circuit 8 to a memory constituted by two flip-flops 47 and 48.

The adder is monitored by a clock, not shown in FIG. 2. That clock controls the advance of the bits constituting the numbers N1, N2 and N3 applied to the exclusive OR gates 71, 73, 75, the advance of the memorizing register 40 and the control element of the AND gate 46. It also controls the logic directing circuit 8.

That directing circuit 8 comprises two first AND gates 81 and 82 each receiving on a first input a control signal at the instant T0, T0 corresponding to the instant of presence of the sign bits at the inputs of the exclusive OR gates 71, 73, 75. The second inputs of these AND gates 81 and 82 are connected up respectively to the sum outputs 44 and 64 of the adders 4 and 6. The logic directing circuit 8 comprises, moreover, two second AND gates, 83, 84, receiving each on a first input, a control signal at the instant $\overline{T0}$, the second inputs of these AND gates 83, 84 being connected up respectively to the sum output 64 and the carry-over output 65 of the adder 6. The output of the AND gate 81 is connected up to the input of the flip-flop 47; the output of the AND gate 82 is connected up to the input of the flip-flop 48. These two AND gates 81 and 82 ensure the memorizing of the sum of the sign bits in the memories 47 and 48 at the instant T0.

In the logic directing circuit 8, a first OR gate 85 connects up the outputs of the AND gates 81 and 83 to the input of the carry-over flip-flop 56, whereas a second OR gate 86 connects up the outputs of the AND gates 82 and 84 to the input of the carry-over flip-flop 66.

The adder comprises, moreover, a comparator 90 receiving, on two first inputs the outputs of the flip-flops 47 and 48 for memorizing the sum of the sign bits and on two second inputs, the outputs of the OR gates 85 and 86. That comparator is controlled at the last instant $Tn$ of the addition cycle T worked out by the clock. That comparator determines the sign of the result of the addition effected; its output is connected up to a flip-flop 91 ensuring the memorizing of that sign.

The output of that flip-flop 91 is connected up to a first input of an AND gate 92 controlled by the signal which is the sign of the result detected at $Tn$, that is, at the end of the addition cycle and during the first instant T'1 of a new clock cycle intended for the transferring of the contents of the register 40.

The output of the flip-flop 91 is also connected up to a first input of an exclusive OR gate 94 receiving on its second input the signal sent out by an AND gate 93 connected up to the memorizing register 40 and controlled during the cycle T'.

The output of the flip-flop 91 having for its value, the exclusive OR gate 94 transforms the result memorized in the register 40 into its restricted complement. The AND gate 92 controlled at the instant T'1 sends out on its output a signal whose value is 1. The AND gate 92 and the exclusive OR gate 94 are connected up to the two inputs of an auxiliary elementary series type adder 95, ensuring the conversion of an auxiliary elementary series type adder 95, ensuring the conversion of the restricted complement, supplied by 94, into its true complement appearing at its sum outputs 96, by adding of a 1 sent out by the AND gate 92, to the bit having the smallest weight of that restricted complement.

The carry-over output 97 of that adder 95 is looped again on its third input through a flip-flop 98 ensuring the shifted carry-over of a possible balance figure appearing at the time of adding a 1 to the bit having the smallest weight of the restricted complement.

In that adder, all the flip-flops and the memorizing register 40 are reset to zero at the beginning of a new adding cycle.

The operation of the adder according to FIG. 2 is given hereinafter:

At the first clock instant T0, the sum S of the sign bits of a negative number is effected and memorized. The sign bits are applied to the inputs of the flip-flops 72, 74, 76. The detecting of these sign bits by the flip-flops is intended to ensure, in the following part of the addition, the possible conversion of the numbers N1, N2, N3 into their restricted complements. These sign bits are transmitted without modification through the exclusive OR gates 71, 73, 75. The addition of the sign bits is effected in the adders 4, 5 and 6; their sum S is put into reserve in the flip-flops 47 and 48, the AND gates 81 and 82 of the logic directing circuit 8 being conductive for that sum at the instant T0. The OR gates 85, 86, connected to the AND gates 81 and 82 of the circuit 8, ensure also the directing of the sum of the sign bits on the carry-over flip-flops 56 and 66. These flip-flops 56 and 66 are then used for ensuring the shifted carry-over by a clock instant of as many 1's as there are negative numbers entering into the addition of the digits N1, N2 and N3 to be effected:

At the clock instant T1 following T0, the state of the sign bits applied at T0 to the inputs D of the flip-flops 72, 74 and 76 appears at the outputs Q of the said flip-flops and will be kept there throughout the whole adding cycle, then the working out of the result of the addition and the storing thereof in the register 40 are begun. The bits having the smallest weight characterizing the numbers N1, N2, N3 are applied, with the outputs of the flip-flops 72, 74, 76, to the inputs of the exclusive OR gates 71, 73 and 75. These bits are possibly transformed into their complement and applied to the adders 4 and 5. The flip-flops 56 and 66 ensure simultaneously, with the presence of the bits having the smallest weights of the numbers the carrying over of any 1's coming from the sum of the sign bits. That carry-over corresponds to the necessary conversion of the restricted complements, from the numbers detected as negative, into their true complement. The adding result is stored, through the AND gate 46 which is conductive at the instants T̄0, in the register 40. The sum of the carry-over bits, worked out at 64 on the adder 6 and the carry-over bit, worked out at 65 on the adder 6, are directed, when there is no T0, by the AND gates 83 and 84 and the OR gates 85 and 86, towards the carry-over flip-flops 66 and 56, delaying them by a clock instant.

At the following successive clock instants, the result Σ of the sum effected and sent out at 44 is successively memorized in the shift register 40 through the conductive AND gate 46. The carry-over of the sum of the carry-over bits worked out at 64 and the carry-over of the balance figure worked out at 65 on the adder 6 are effected in the same way as at the instant T1.

At the last instant Tn of the addition cycle T worked out by the clock, the exceeding data D is extracted. The memorizing register 40 contains the result Σ of the addition effected. The exceeding bits, that is, D, formed on an adding of numbers having different polarities, are then applied to the outputs 64 and 65 of the adder 6. The binary word S, which is the sum of the sign bits and the binary word D, exceeding elements, are compared in the comparator 90. If D    S, the output of the comparator assumes the logic state 1; that output signal whose value is 1 indicates that the result Σ memorized in the register 40 is applied in the form of a true complement. The sign bit, in the case, is transmitted on the output 96 by the AND gate 92 whose output is in the state 1 and by the adder 95. If D > S, the output of the comparator 90 is in the logic state 0. That output signal whose value is 0 indicates that the result stored in the register 40 is positive and is in its true form. The output 96 remains in the latter case in the state 0.

During the cycle T', the transfer of the contents of the register 40 to the output 96 is ensured, that cycle T' following the addition cycle T effected. If the result Σ stored in the register 40 is detected as being negative, it is put in a true form by the exclusive OR circuit 94 working out its restricted complement by the AND gate 92, whose output remains at 1 during the first transfer instant T'1, enabling the adjoining of a 1 necessary for the conversion of the restricted complement into a true complement and by the adder 95. If the result is detected as being positive, the output of the AND gate 92 remains at 0, the OR exclusive gate 94 and an adder 95 transmit to the output 96 the result Σ present at 40, without modification.

The device described sends out, at the output 96, a binary number which is the sum of the input binary numbers N1, N2, N3, in the true form, whatever the sign of the input digits and the sign of the "provisional" result memorized in the register 40 may be. That result sent out at the output 96 is preceded by its sign binary element and is also directly usable.

The present invention has been described by means of an embodiment given by way of an example in the drawing. It is evident that without going beyond the scope of that invention, details may be modified therein and/or certain means may be replaced by other which are technically equivalent.

What is claimed is:

1. A series type adder for adding during successive clock periods a plurality of binary numbers of any polarity received in serial form and having a sign bit as the first bit thereof by adding positive numbers and true complement of negative numbers, comprising a plurality of detection circuits for storing the respective sign bits of said binary numbers, gate means responsive to said detection circuits for forming the true complements of the negative binary numbers, adding means including a plurality of elementary series type adders for adding said positive numbers and the true complements of negative numbers, delay means for re-injecting carry-over bits and bits representing the sum of carry-over bits coupled from outputs of said adding means to inputs thereof, memory means connected to said adding means for storing the output thereof representing the addition of said binary numbers, logic directing means responsive to the outputs of one of said elementary series type adders for providing during one clock instant of an adding cycle a sum output representing the sum of the sign bits of the negative numbers and during another clock instant of said adding cycle the carry-over output of said adding means, auxiliary memory means connected to said logic directing means for storing said sum output thereof, circuit means, included within said logic directing means, for providing the carry-over output from said logic directing means, comparator means for comparing the output of said auxiliary memory means to the output of said circuit means during a final clock instant of said adding cycle, and transfer means connected to said comparator means for enabling the contents of said memory means to be preceded by a sign bit determined by the output of said comparator means.

2. An adder as defined in claim 1 wherein said adding means includes three elementary series type adders for adding three binary numbers, one of said elementary adders receiving one of said binary numbers and bits representing the sum of carry-over bits, a second elementary adder receiving the other two binary numbers and the sum output of said one elementary adder, and the third elementary adder receiving the carry-over outputs of said one and said second elementary adders as well as the re-injected carry-over bits from the output of said adding means.

3. An adder as defined in claim 2 wherein said memory means includes a shift register and a first logic gate for connecting the sum output of said second elementary adder to said shift register.

4. An adder as defined in claim 3 wherein said detection circuits comprise respective flip-flop circuits receiving said sign bits and said gate means includes respective EXCLUSIVE OR gates receiving a respective binary number at one input and the output of a respective flip-flop circuit at the other input, the outputs of said EXCLUSIVE OR gates being connected to the inputs of said one and said second elementary adders.

5. An adder as defined in claim 4 wherein said delay means includes a pair of additional flip-flops receiving the outputs of said logic directing means and being connected to inputs of said one and said third elementary adders.

6. An adder as defined in claim 5 wherein said logic directing means includes gating means for connecting the sum outputs of said second and said third elementary adders to said pair of additional flip-flops during said one clock instant.

7. An adder as defined in claim 6 wherein said logic directing means further includes additional gating means for connecting the sum output and the carry output of said third elementary adder to respective ones of said pair of additional flip-flops during said other clock instant.

8. An adder as defined in claim 1 wherein said auxiliary memory means comprises a pair of flip-flops receiving the sum outputs of said second and third elementary adders from said logic directing means during said one clock instant.

9. An adder as defined in claim 8 wherein said transfer means includes conversion means responsive to said comparator means for converting the data of said shift register to its true complement when the sign thereof is negative.

10. An adder defined in claim 8 wherein said transfer means comprises a first binary circuit connected to the output of said comparator means, a first gating circuit connected to the output of said first binary circuit, a further EXCLUSIVE OR gate having one input connected to the output of said first binary circuit and a second input connected to the output of said shift register through a second gating circuit, a further elementary adder having inputs connected to the outputs of said EXCLUSIVE OR gate and said first gating circuit, and a second binary circuit for coupling the carryover output of said further elementary adder to an input thereof, the other output of said further elementary adder representing the output of said transfer means.

* * * * *